(12) United States Patent
Ruppe et al.

(10) Patent No.: US 11,656,528 B1
(45) Date of Patent: May 23, 2023

(54) NONLINEAR INCOHERENT COMBINING OF PULSED LASERS

(71) Applicant: LOCKHEED MARTIN CORPORATION, Bethesda, MD (US)

(72) Inventors: John Myron Ruppe, Broomfield, CO (US); Bruce Gregory Tiemann, Longmont, CO (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 17/394,092

(22) Filed: Aug. 4, 2021

Related U.S. Application Data

(60) Provisional application No. 63/061,087, filed on Aug. 4, 2020.

(51) Int. Cl.
*G02F 1/35* (2006.01)
*G02B 27/12* (2006.01)
*G02B 19/00* (2006.01)

(52) U.S. Cl.
CPC ........ *G02F 1/3511* (2013.01); *G02B 19/0009* (2013.01); *G02B 19/0047* (2013.01); *G02B 27/123* (2013.01)

(58) Field of Classification Search
CPC .. G02B 27/123; G02B 19/0047; G02B 23/10; G02B 23/02; G02B 23/06; G02B 23/04; G02B 23/00; G02B 19/009; G02F 1/3511
See application file for complete search history.

(56) References Cited

U.S. PATENT DOCUMENTS

| 2005/0127049 A1* | 6/2005 | Woeste | B23K 26/04 219/121.72 |
| 2006/0092995 A1* | 5/2006 | Frankel | H01S 5/0609 372/18 |
| 2012/0236212 A1* | 9/2012 | Itoh | G03B 21/208 348/744 |
| 2021/0165135 A1* | 6/2021 | Tillkorn | G02B 27/1006 |

* cited by examiner

*Primary Examiner* — Christopher Stanford
*Assistant Examiner* — Journey F Sumlar
(74) *Attorney, Agent, or Firm* — BakerHostetler

(57) ABSTRACT

Multiple collimated laser beams can be arranged in a tightly packed non-overlapping array the goes through a telescope system to reduce the size of the beams and also the separation between the beam centers. The beams in the resulting smaller array then diverge until they reach a nonlinear lens, which collimates each of the beams individually so that all of the beams are collimated, pointing in the same direction and overlapping. The pulses in the beams are temporally separated from each other such that the nonlinear lens acts as a different lens for each of the beams. Such an arrangement facilitates scaling the far field average intensity by combining multiple temporally interleaved pulsed laser beams, allowing diverging pulsed laser beams to be collimated individually by utilizing the large nonlinear refractive index of certain materials.

16 Claims, 5 Drawing Sheets

NONLINEAR INCOHERENT COMBINING OF PULSED LASERS

CROSS-REFERENCE TO RELATED APPLICATIONS

This application claims the benefit of U.S. Provisional Application No. 63/061,087, entitled "NONLINEAR INCOHERENT COMBINING OF PULSED LASERS," filed Aug. 4, 2020, the entirety of which is incorporated herein by reference.

STATEMENT REGARDING FEDERALLY SPONSORED RESEARCH OR DEVELOPMENT

Not applicable.

FIELD OF THE INVENTION

The present invention generally relates to photonic integrated circuits and, more particularly, to an incoherent combination of pulsed laser beams.

BACKGROUND

Many aerospace systems look to increase or scale up the average power of pulsed laser system. Fiber lasers currently are able to increase the average power up to only about 300 W when used for high energy pulses due to the onset of modal instabilities in the large core fibers. Solid state laser systems also typically have problems scaling to powers beyond the 1 kW regime with high energy pulses due to thermally induced focusing effects. Further, a single solid-state laser is typically designed to only be able to operate at a single average power due to these thermal effects. It is desirable for a pulsed laser to be able to operate at multiple average powers to be able to perform a variety of missions.

BRIEF DESCRIPTION OF THE DRAWINGS

For a more complete understanding of the present disclosure, and the advantages thereof, reference is now made to the following descriptions to be taken in conjunction with the accompanying drawings describing specific aspects of the disclosure, wherein.

DETAILED DESCRIPTION

Figure 1:
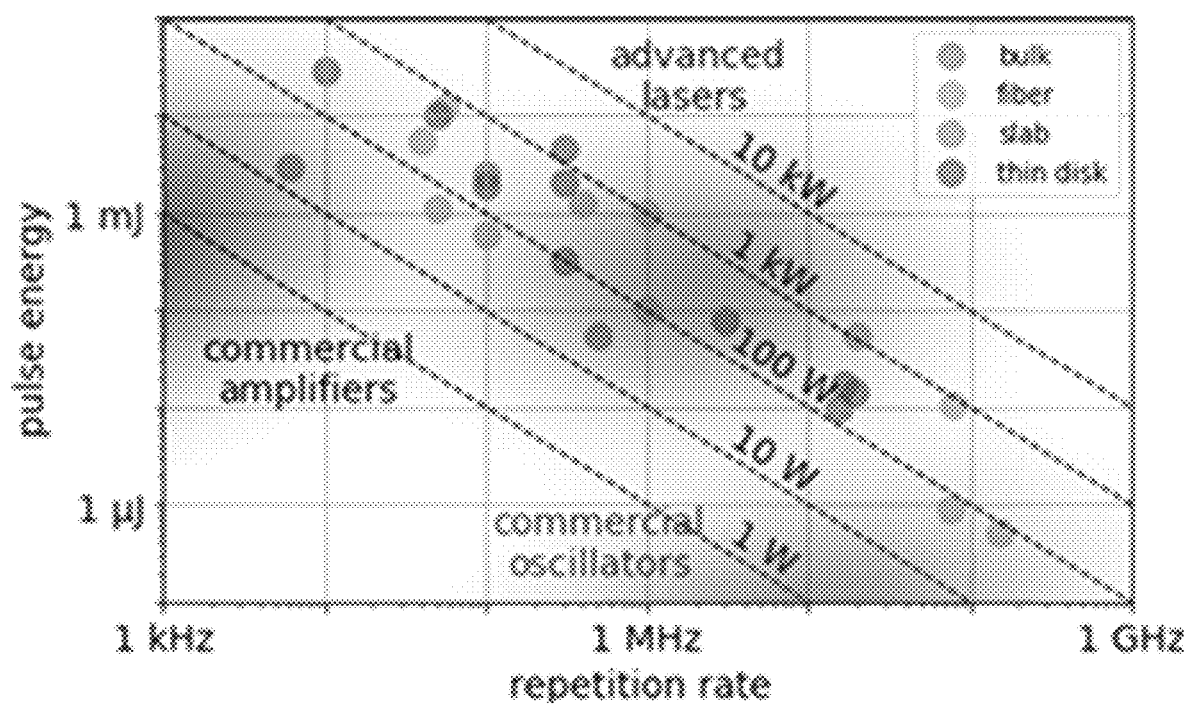
FIG. 1 shows a chart illustrating amplifiers and oscillators (e.g., bulk, fiber, slab, thin disk) plotted on a pulse energy vs. repetition rate graph.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

Incoherent combination of pulsed laser beams is typically done either using spectral beam combining or by disposing the beams side-by-side in a tiled array. Spectral beam combining is limited in pulse applications since it requires combining multiple narrow-band optical sources. This may not be a desirable characteristic (e.g., when it is desired that the total output beam be narrow-band or when the sources are broad-band). The tiled array approach is problematic in that the far field beam divergence is completely determined by the divergence of a single beam. Therefore, average power scaling does not also result in intensity scaling in the far field. Coherent beam combining may overcome the limitations of each of the spectral beam combining or tiled array techniques, though it requires very high precision servos to control the individual laser path lengths to much smaller than the carrier wavelength, which adds tremendous complications in both design and control loops.

In some aspects of the present technology, methods and systems to scale the average power of pulsed laser systems are disclosed. The subject technology enables incoherent combination of multiple pulsed laser beams, with a maximum combined average power scalable up to the peak power of each pulse (e.g., >1 MW), while maintaining low far field beam divergence.

In an aspect of the subject disclosure, multiple collimated laser beams are arranged in a tightly packed non-overlapping array. The array then goes through a demagnification telescope to reduce the size of the beams and also the separation between the beam centers. The beams in the resulting smaller array then diverge until they reach the nonlinear material, which collimates each of the beams individually so that all of the beams are collimated, pointing in the same direction and overlapping. In order to have the nonlinear material act as a different lens for each of the beams, the pulses in the beams are temporally separated so that there is no cross-talk between the different beams.

Thus, the subject disclosure provides for scaling the far field average intensity by combining multiple temporally interleaved pulsed laser beams, allowing diverging pulsed laser beams to be collimated individually by utilizing the large nonlinear refractive index of certain materials. Accordingly, by collimating beams that are overlapping in space, but not in time, the far-field divergence of a large array of laser beams may be greatly reduced.

Sources with any bandwidth or polarization state may be combined by the subject technology so long as the pulse temporal shape is approximately square and the peak power is at the correct value for collimation by the nonlinear material. Thus, the subject disclosure overcomes the typical conservation of etendue by utilizing a nonlinear effect.

FIG. 1 is a diagram illustrating commercial amplifiers and oscillators (e.g., bulk, fiber, slab, thin disk) plotted on a pulse energy vs. repetition rate graph. Power scaling of good beam quality is typically limited to about 1 kW average power due primarily to a variety of thermal effects.

Figure 2:
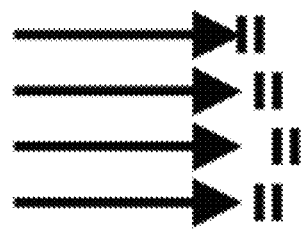
FIG. 2 shows a diagram of an incoherent tiled array beam combining system.

Referring to FIGS. 2-6, various methods can be employed to combine beams. FIG. 2 shows a diagram of an incoherent tiled array beam combining system. Incoherent tiled array beam combining may be employed by simultaneously producing pulses from laser sources that are next to each other, without having the laser sources interacting with or coordinate between each other such that there is no coherence between the pulses. The resulting combined beam provides no brightness improvement because the pulses are incoherent with each other.

Figure 3:
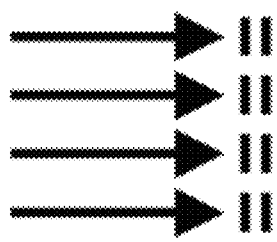
FIG. 3 shows a diagram of a coherent tiled array beam combining system.
Figure 4:
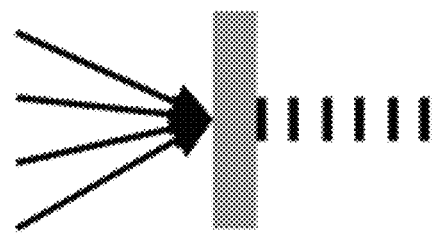
FIG. 4 shows a diagram of a coherent filled aperture beam combining system.

FIG. 3 shows a diagram of a coherent tiled array beam combining system, and FIG. 4 shows a diagram of a coherent filled aperture beam combining system. In both coherent tiled array beam combining and coherent filled aperture beam combining, the simultaneously produced pulses must be coherent and must be combined with constructive interference, which requires complex control systems to achieve.

Figure 5:
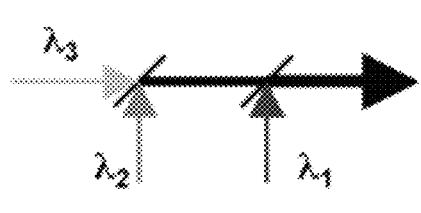
FIG. 5 shows a diagram of beam combining system with dichroic mirrors.
Figure 6:
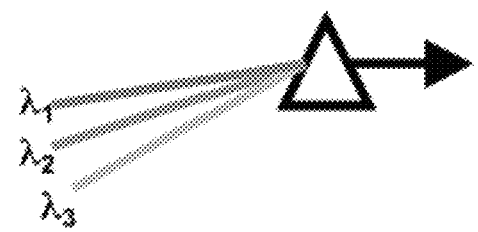
FIG. 6 shows a diagram of an incoherent spectral beam combining system.

FIG. 5 shows a diagram of beam combining system with dichroic mirrors, and FIG. 6 shows a diagram of an incoherent spectral beam combining system. In such systems, the pulses from different sources are different colors and are provided to spectral filters (FIG. 5), prisms (FIG. 6) and/or gratings to combine with each other. Such systems can provide a combined beam with increased brightness. However, the number of dichroic mirrors needed or angles available based on the prism or grating limits the scalability of the system. The colors needed and different optical bandwidth over which a corresponding gain medium functions present further limitations on the number of beams that can be combined in such systems.

Figure 7:
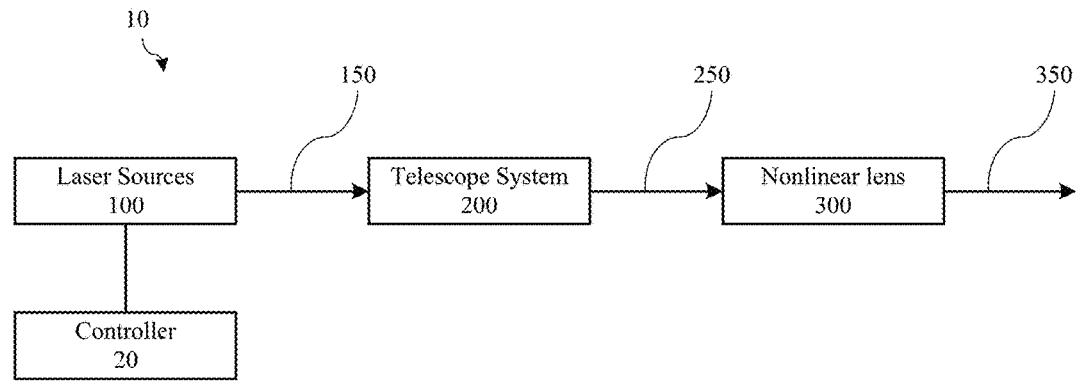
FIG. 7 shows a block diagram of an optical system for nonlinear incoherent combining of pulsed laser beams, according to embodiments of the present disclosure.

FIG. 7 shows a block diagram of an optical system for nonlinear incoherent combining of pulsed laser beams, according to embodiments of the present disclosure. As shown in FIG. 7, an optical system 10 can include a controller 20, multiple laser sources 100, a telescope system 200, and a nonlinear lens 300. The controller 20 can be configured to operate the laser sources 100 to produce multiple collimated input beams 150. For example, the laser sources 100 can provide a close-packed array of pulsed collimated laser beams. The telescope system 200 can be arranged to receive the collimated input beams 150, The telescope system 200 is configured to modify each of the collimated input beams 150 to produce diverging beams 250. The nonlinear lens 300 is arranged to receive the diverging beams 250. The nonlinear lens 300 refracts each of the diverging beams 250 to produce spatially overlapping collimated output beams 350. The controller 20 can operate the laser sources 100 to produce multiple collimated input beams 150 in sequence, such that the collimated input beams 150, the diverging beams 250, and/or the collimated output beams 350 are temporally non-overlapping, as described further herein.

Figure 8:
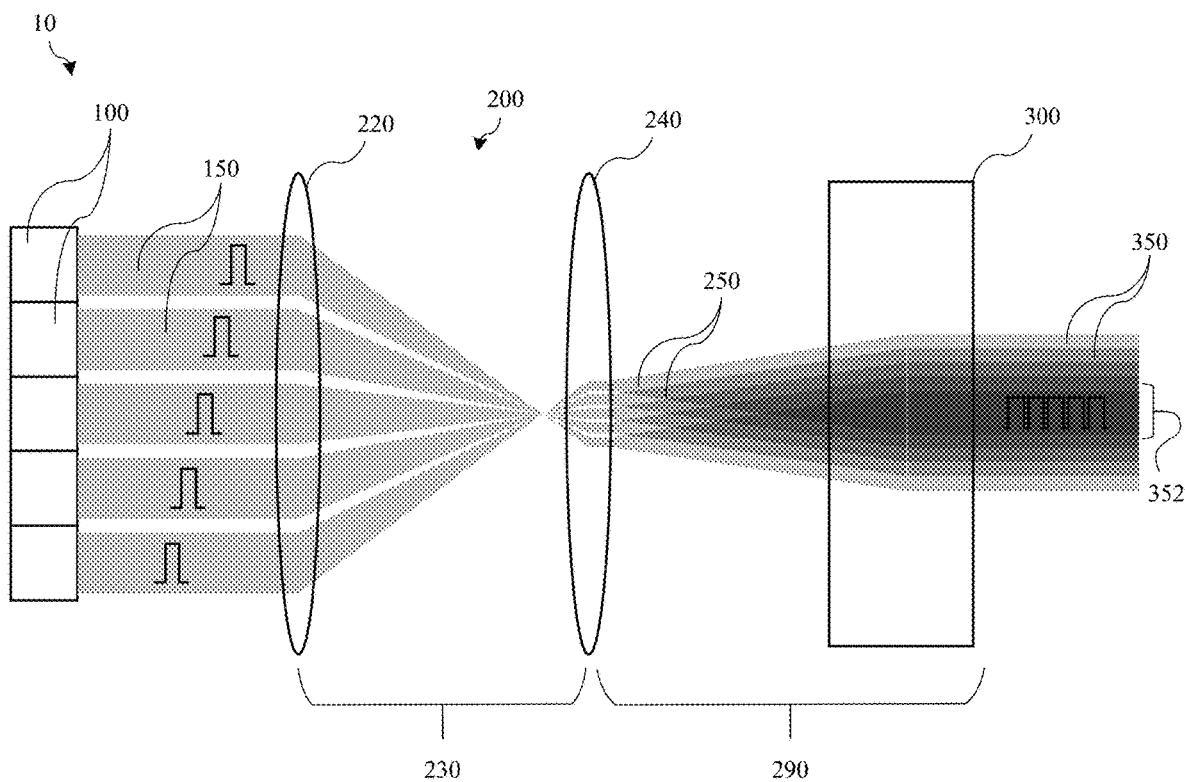
FIG. 8 shows a schematic diagram of an optical system for nonlinear incoherent combining of pulsed laser beams, according to embodiments of the present disclosure.

FIG. 8 shows a schematic diagram of an optical system for nonlinear incoherent combining of pulsed laser beams, according to embodiments of the present disclosure. As shown in FIG. 8, each of the laser sources 100 can produce a corresponding one of multiple collimated input beams 150. The collimated input beams 150 can travel along parallel, spatially non-overlapping input paths. While the laser sources 100 and the collimated input beams 150 of FIG. 8 are arranged to be staggered along a single (e.g., vertical) axis, it will be understood that this is a schematic depiction and that a variety of arrangements can be achieved to produce collimated input beams 150 along parallel, spatially non-overlapping input paths. For example, the laser sources 100 can be arranged to arrive at the telescoping system 200 in a close-packed arrangement, such as an arrangement having a cross-sectional profile of a hexagonal close-packed and/or cubic close-packed arrangement, with optional gaps between the beams.

The laser sources 100 can be operated to produce each of the collimated input beams 150 at different times, as shown in FIG. 8. For example, each laser source 100 can produce a pulsed input beam 150 during a period of time in which no other laser source 100 is producing an input beam 150. Such operations can be managed and coordinated, for example, with duty cycles of the laser sources 100. By further example, the activity of each laser source 100 can be based on the total number of laser sources 100 that are included and operated. At any given time, one, some, or fewer than all of the laser sources 100 can be operated to provide an input beam 150.

The telescope system 200 can be arranged to receive and modify each of the collimated input beams 150 to produce diverging beams 250. In some embodiments, the telescope system 200 can include lenses to modify the collimated input beams 150. For example, as shown in FIG. 8, the telescope system 200 can include a first converging lens 220 for receiving the collimated input beams 150 and a second converging lens 240 to output the diverging beams 250. The first converging lens 220 and the second converging lens 240 can be separated by a distance 230 that is equal to a sum of the focal lengths of the first converging lens 220 and the second converging lens 240. It will be understood that alternative and/or additional optical elements can be utilized to modify the collimated input beams 150 and produce the diverging beams 250. For example, as described further herein, one or more mirrors can be provided to receive and modify the input beams 150.

The array of pulsed collimated input beams 150 can telescoped down to a smaller size so that the resulting diverging beams 250 diverge more rapidly than did the collimated input beams 150. For example, the diverging beams 250 can each have a beam width that is smaller than the beam width of the corresponding collimated input beams 150 from which it emerged. The diverging beams 250 can travel along spatially overlapping paths between the telescope system 200 and the nonlinear lens 300. While the diverging beams 250 diverge along their path, a centerline of each diverging beam 250 can be parallel to that of any other diverging beam 250. As such, the extend of spatial overlap can increase as the diverging beams 250 approach the nonlinear lens 300. It will be understood that spatial overlap can occur even though the diverging beams 250 can be from input beams 150 that are pulsed at different times (i.e., temporally non-overlapping), as described herein. Accordingly, spatial overlap between multiple beams refers to overlap that would occur if each of the multiple beams were contemporaneously produced, even if no contemporaneously production is actually occurring.

The nonlinear lens 300 can have an intensity-dependent refractive index. For example, the nonlinear lens 300 can have a lens effect based on the intensity of the diverging beam 250 that is incident upon the nonlinear lens 300. Based on the optical Kerr effect, the nonlinear lens 300 can provide self-focusing caused by the spatial variation in the intensity creating a spatial variation in the refractive index. In some embodiments, the material of the nonlinear lens 300 can include a transparent crystal, fused silica, sapphire, yttrium aluminum garnet ($Y_3Al_5O_{12}$), yttrium vanadate ($YVO_4$), calcite ($CaCO_3$), calcium fluoride ($CaF_2$), combinations thereof, and the like. The material of the nonlinear lens 300 can have a nonlinear index of at least $1*10^{-20}$, $2*10^{-20}$, $3*10^{-20}$, $4*10^{-20}$, $5*10^{-20}$, $6*10^{-20}$, $7*10^{-20}$, $8*10^{-20}$, $9*10^{-20}$, or $10*10^{-20}$ m$^2$/W (inclusive of any values there between) at one or more operating frequencies of the laser sources 100.

The nonlinear lens 300 can collimate each diverging beam 250 independently (e.g., as when the pulses are separated in time) to produce collimated output beams 350. The output beams 350 from the nonlinear lens 300 are each collimated, but are overlapping in space. For example, the collimated output beams 350 can travel along parallel, spatially overlapping output paths. The extend of spatial overlap can be partial, as each of the diverging beams 250 can be incident on the nonlinear lens 300 at a different, corresponding region thereof. Because the diverging beams 250 spatially overlap each other by the time they reach the nonlinear lens 300, the modification (e.g., collimation) provided by the nonlinear lens 300 produces a spatially overlapping region 352 among the collimated output beams 350. The spatially overlapping region 352 can be a region in which some or all of the collimated output beams 350 are spatially overlapping with each other. In some embodiments, at least 50%, 55%, 60%, 65%, 70%, 75%, 80%, 85%, 90%, 95%, or 99% (inclusive of any values there between) of any one of the collimated output beams 350 spatially overlaps one, some, or all of the other collimated output beams 350. For example, at least 50%, 55%, 60%, 65%, 70%, 75%, 80%, 85%, 90%, 95%, or 99% (inclusive of any values there between) of any one of the collimated output beams 350 spatially overlaps with another one of the collimated output beams 350. It will be understood that spatial overlap can occur even though the collimated output beams 350 can be from input beams 150 that are pulsed at different times (i.e., temporally non-overlapping), as described herein.

The second converging lens 240 (or other terminal end element of the telescope system 200 from which diverging beams 250 emanate) and the nonlinear lens 300 are separated by a distance 290 equal to an effective focal length of the nonlinear lens 300 upon incidence of the diverging beams 250. It will be understood that the effective focal length of the nonlinear lens 300 can be a product of the material of the nonlinear lens 300, dimensions (e.g., thickness, shape, etc.) of the nonlinear lens 300, and the intensity of each diverging beam 250 that is incident upon the nonlinear lens 300. Because the material, dimensions, and intensity can be known and/or controlled, the effective focal length can be determined, and an appropriate distance 290 can be selected. The distance 290 can optionally be controlled by moving the nonlinear lens 300 or other components relative to the nonlinear lens 300. It will be understood that such movement may not be required during a sequence of pulses as long as the intensity of the pulses is maintained at a consistent level.

For example, the effective focal length of a nonlinear lens can be calculated using $$f_{nonlinear} = \frac{\pi w_z^4}{8 P_0 \gamma L}$$

and approximating the beam radius after diverging using $$w_z = w_0 \sqrt{1 + \left(\frac{z\lambda}{\pi w_0^2}\right)^2} \approx \left(\frac{z\lambda}{\pi w_0}\right).$$

To have collimation, the effective focal length of the nonlinear lens may be set using $$f_{nonlinear} = z = 2\pi \left(\frac{P_0 \gamma L w_0^4}{\lambda^4}\right)^{\frac{1}{3}}.$$

By further example, given $$P_0 = 1 MW, \gamma = 10^{-17} \frac{m^2}{W}, L = 0.1 \text{ m and } w_0 = 0.1 \text{ mm},$$

then the resulting effective focal length of the nonlinear lens $f_{nonlinear}$=0.27 m and the beam radius after diverging is $w_z$=0.91 mm. In this example, catastrophic self-focusing would occur in this material if the material length reached $$z_{sf} = \frac{w_z^2 \sqrt{\pi}}{2\sqrt{n_0 \gamma P_0}} = 0.2 \text{ m.}$$

However, since L=0.1 m in the above example, which is smaller than the 0.2 m length threshold, there is no catastrophic self-focusing in this example.

As further shown in FIG. 8, the collimated output beams 350 can be combined to provide a combined beam, at least at the spatially overlapping region 352. By using the Kerr nonlinearity of the nonlinear lens 300 to produce collimated output beams 350, enormous power scaling of the average far-field brightness is enabled for a wide range of desired pulsed laser parameters. Despite the laser sources producing only intermittent pulses (e.g., with significant "off" time in the duty cycle of each), the collimated output beams 350 are combined such that, while being temporally non-overlapping, they are spatially overlapping. As such, each laser source 100 can be operated at sustainable output levels (e.g., with significant "off" time) to produce combined collimated output beams 350 that, at the region of overlap and across a period of time, have higher power than that of any one of the laser sources 100. At any given moment, the desired collimated output beams 350 can be produced based on operation of one or more (but optionally fewer than all) of the laser sources 100. As such, average power scaling may be provided up to the peak power of the pulses (e.g., MW scale or greater) without fundamental limitations. This provides for a wide range of pulsed laser parameters (e.g., broadband pulses, narrowband pulses, arbitrary polarization states). Also, no coherence is required between the channels. Further, the subject technology is modular, as no cross-talk between the channels may be provided.

An example for power scaling pulsed lasers is now described. Start with an N×N array of collimated 1 mm radius beams (e.g., Total area=4N² mm², Rayleigh range=3 m). That array goes through the telescope, which assuming a magnification of 0.1 results in an array of collimated 0.1 mm radius beams (e.g., Total area=0.04*N² mm², Rayleigh range=0.03 m). Those beams are allowed to diverge until they again each reach a radius of 1 mm when they hit the nonlinear material and get collimated again (e.g., Total area=0.04*N² mm², Rayleigh range=3 m). That array goes through a final telescope, assuming a magnification of 10, which results in an array of collimated beams each with a radius of 10 mm (e.g., Total area=4N² mm², Rayleigh range=300 m). Thus, the final array has a much smaller far field divergence than the initial array due to the nonlinear interaction (e.g., increased Rayleigh range by 2 orders of magnitude).

An example for beam expansion is now described. For example, the Beam Expansion Factor can be shown by $$E_F = \frac{w_z}{w_0} = \left(\frac{2}{w_0}\right)\left(\frac{w_0 P_0 \gamma L}{\lambda}\right)^{\frac{1}{3}}.$$

In addition, the maximum Beam Expansion Factor may be shown as approximately when the length of the material equals the catastrophic self-focusing length. Thus, the maximum Beam Expansion Factor may be determined using $$E_{F,max} = \left(\frac{4}{\lambda}\right)\left(\frac{\pi P_0 \gamma}{n_0}\right)^{\frac{1}{2}}.$$

Figure 9:
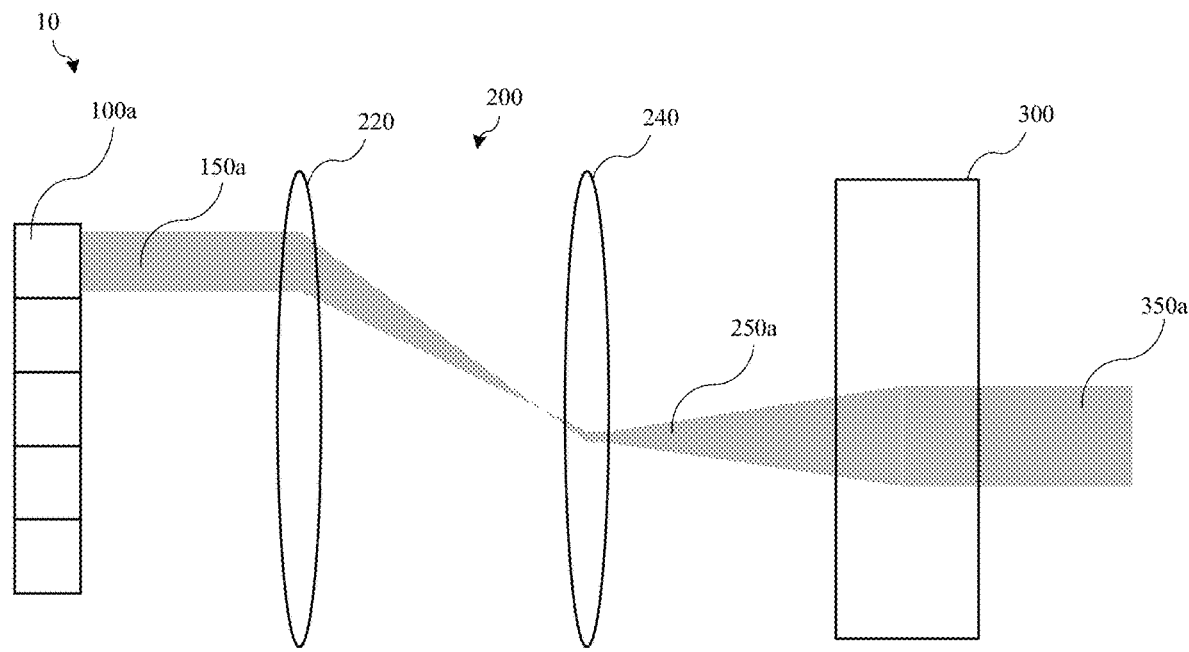
FIG. 9 shows a schematic diagram of the optical system of FIG. 8 in first stage of operation, according to embodiments of the present disclosure.
Figure 10:
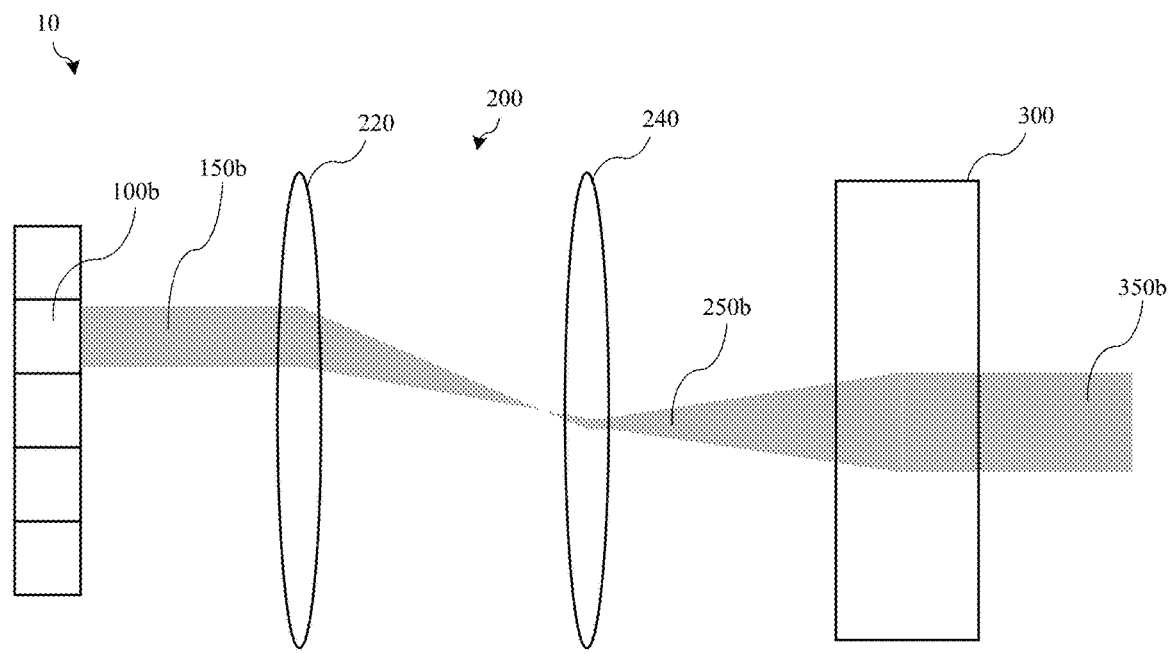
FIG. 10 shows a schematic diagram of the optical system of FIGS. 8 and 9 in second stage of operation, according to embodiments of the present disclosure.

Referring now to FIGS. 9 and 10, the separate laser sources can be operated in sequence to produce different beams that are temporally non-overlapping.

FIG. 9 shows a schematic diagram of the optical system of FIG. 8 in first stage of operation, according to embodiments of the present disclosure. As shown in FIG. 9, in a first stage of operation, a first collimated input beam 150a is produced with a first laser source 100a. No other input beams need be produced by the other laser sources at the same time. For example, all other laser sources can be off while the first collimated input beam 150a is produced with the first laser source 100a.

The first collimated input beam 150a is modified with a telescope system 200 to produce a first diverging beam 250a. The first diverging beam 250a can have a minimum beam width, at its exit from the telescope system 200, that is smaller than a beam width of the first collimated input beam 150a. This can result in divergence of the first diverging beam 250a.

The first diverging beam 250a can be refracted with the nonlinear lens 300 to produce a first collimated output beam 350a. The lens effect of the nonlinear lens 300 is based, in part, on the intensity of the first diverging beam 250a.

FIG. 10 shows a schematic diagram of the optical system of FIGS. 8 and 9 in second stage of operation, according to embodiments of the present disclosure. As shown in FIG. 10, in a second stage of operation, a second collimated input beam 150b is produced with a second laser source 100b. The second collimated input beam 150b is produced after the first collimated input beam 150a is produced by the first laser source 100a. No other input beams need be produced by the other laser sources at the same time. For example, all other laser sources can be off while the second collimated input beam 150b is produced with the second laser source 100b. The second collimated input beam 150b can be parallel to the first collimated input beam 150a (i.e., when it was produced). As such, the first and second collimated input beams 150a and 150b can travel along parallel, spatially non-overlapping input paths.

The second collimated input beam 150b can be modified with the telescope system 200 to produce a second diverging beam 250b. The second diverging beam 250b can have a minimum beam width, at its exit from the telescope system 200, that is smaller than a beam width of the second collimated input beam 150b. This can result in divergence of the second diverging beam 250b. With such divergence, the first and second diverging beams 250a and 250b can travel along spatially overlapping paths between the telescope system 200 and the nonlinear lens 300.

The second diverging beam 250b can be refracted with the nonlinear lens 300 to produce a second collimated output beam 350b. The lens effect of the nonlinear lens 300 is based, in part, on the intensity of the first diverging beam 250a. The second collimated output beam 350b spatially overlaps the first collimated output beam 350a, although the first collimated output beam 350a and the second collimated output beam 350b can be temporally non-overlapping.

It will be understood that a similar sequence can be further performed for other laser sources of the optical system. While five laser sources are illustrated, any number of laser sources can be provided and operated. For example, the optical system can include 2, 3, 4, 5, 6, 7, 8, 9, 10, or greater than 10 laser sources to produce corresponding beams. The other components of the system can be arranged to receive, modify, and combine such beams. The laser sources can be operated in any sequence. In some embodiments, the laser sources are operated in cycles having the same or different sequences of operated laser sources. Any number of cycles can be performed to produce the combined output beam for a desired duration of time.

Figure 11:
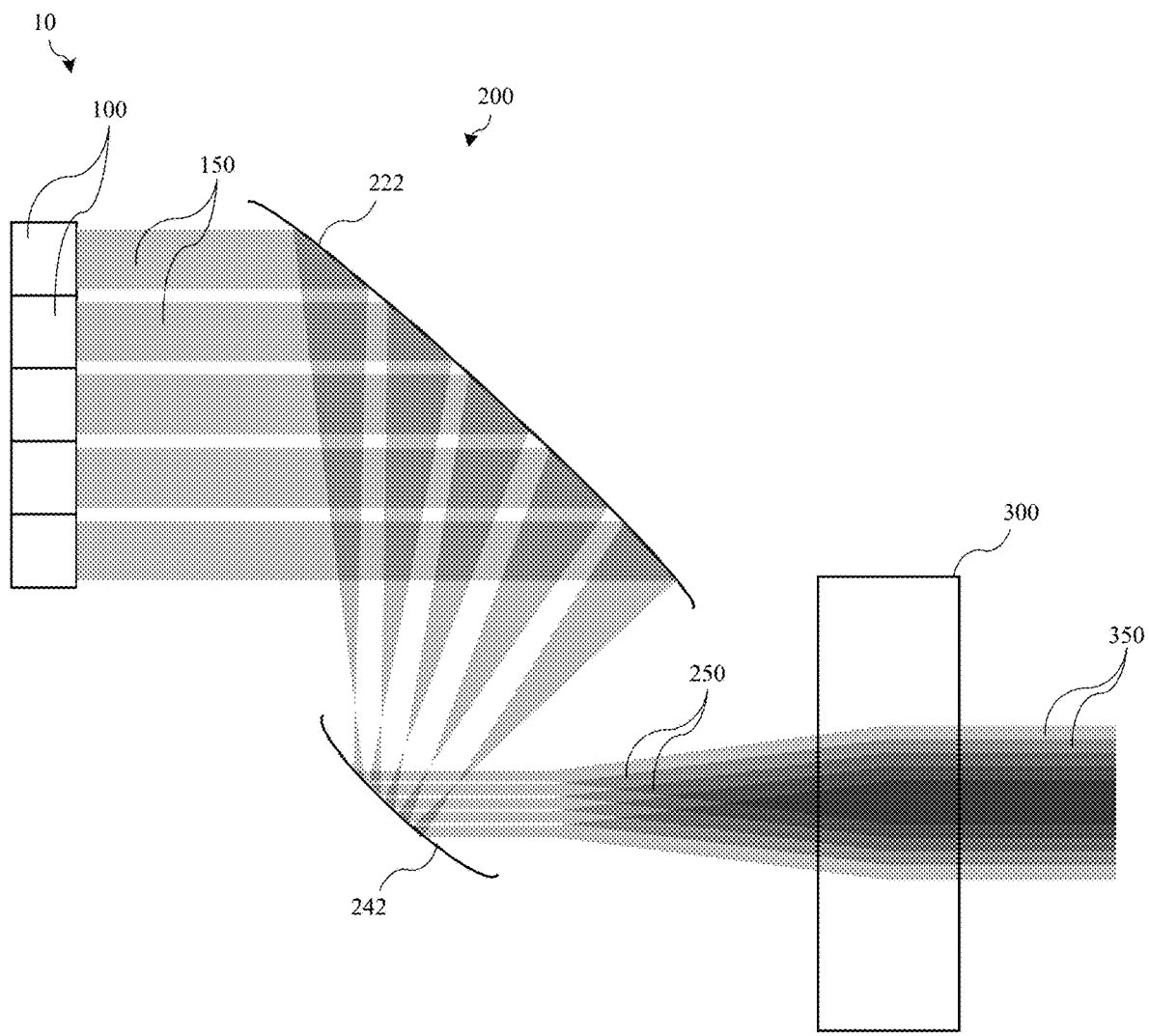
FIG. 11 shows a schematic diagram of an optical system for nonlinear incoherent combining of pulsed laser beams, according to embodiments of the present disclosure.

FIG. 11 shows a schematic diagram of an optical system for nonlinear incoherent combining of pulsed laser beams, according to embodiments of the present disclosure. As shown in FIG. 11, the telescope system 200 can include mirrors in addition to or instead of lenses (FIG. 8). Such a telescope system 200 can receive the collimated input beams 150 and produce the diverging beams 250 as described elsewhere herein. For example, each of the laser sources 100 can produce a corresponding one of multiple collimated input beams 150. The telescope system 200 can be arranged to receive and modify each of the collimated input beams 150 to produce diverging beams 250. In some embodiments, the telescope system 200 can include mirrors to modify the collimated input beams 150. For example, as shown in FIG. 8, the telescope system 200 can include a first mirror 222 (e.g., curved or convex mirror) for receiving the collimated input beams 150 and a second mirror 242 (e.g., curved or convex mirror) to output the diverging beams 250. The mirror properties (e.g., curvature) and position can be selected to produce the desired beam modification (e.g., beam size adjustment and divergence). It will be understood that alternative and/or additional optical elements can be utilized to modify the collimated input beams 150 and produce the diverging beams 250. The diverging beams 250 can have one or more (e.g., all) of the characteristics described elsewhere herein. The nonlinear lens 300 can collimate each diverging beam 250 independently (e.g., as when the pulses are separated in time) to produce collimated output beams 350.

Accordingly, embodiments of the present disclosure provide multiple collimated laser beams that can be arranged in a tightly packed non-overlapping array the goes through a telescope system to reduce the size of the beams and also the separation between the beam centers. The beams in the resulting smaller array then diverge until they reach a nonlinear lens, which collimates each of the beams individually so that all of the beams are collimated, pointing in the same direction and overlapping. The pulses in the beams are temporally separated from each other such that the nonlinear lens acts as a different lens for each of the beams. Such an arrangement facilitates scaling the far field average intensity by combining multiple temporally interleaved pulsed laser beams, allowing diverging pulsed laser beams to be collimated individually by utilizing the large nonlinear refractive index of certain materials.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. An optical system comprising:
   multiple laser sources operable to produce collimated input beams;
   a telescope system arranged to receive the collimated input beams, wherein the telescope system is configured to modify each of the collimated input beams to produce diverging beams that have a beam width that is smaller than the beam width of the collimated input beams, the telescope system comprising:
   a first converging lens for receiving the collimated input beams; and a second converging lens to output the diverging beams, wherein the first converging lens and the second converging lens are separated by a distance equal to a sum of their corresponding focal lengths; and a nonlinear lens having an intensity-dependent refractive index and arranged to receive the diverging beams and refract each of the diverging beams to produce spatially overlapping collimated output beams.

2. The optical system of claim 1, wherein the second converging lens and the nonlinear lens are separated by a distance equal to an effective focal length of the nonlinear lens upon incidence of the diverging beams.

3. The optical system of claim 1, wherein the collimated input beams travel along parallel, spatially non-overlapping input paths.

4. The optical system of claim 1, wherein the diverging beams travel along spatially overlapping paths between the telescope system and the nonlinear lens.

5. The optical system of claim 1, wherein at least 80% of any one of the collimated output beams spatially overlaps with another one of the collimated output beams.

6. The optical system of claim 1, wherein the collimated output beams travel along parallel, spatially overlapping output paths.

7. A method comprising:
producing a first collimated input beam with a first laser source;
modifying the first collimated input beam with a telescope system to produce a first diverging beam;
refracting the first diverging beam with a nonlinear lens having an intensity-dependent refractive index to produce a first collimated output beam;
producing a second collimated input beam with a second laser source, the second collimated input beam being parallel to the first collimated input beam;
modifying the second collimated input beam with the telescope system to produce a second diverging beam; and
refracting the second diverging beam with the nonlinear lens to produce a second collimated output beam that spatially overlaps the first collimated output beam, wherein the first diverging beam has a minimum beam width, at the telescope system, that is smaller than a beam width of the first collimated input beam, and the second diverging beam has a minimum beam width, at the telescope system, that is smaller than a beam width of the second collimated input beam.

8. The method of claim 7, wherein producing the second collimated input beam is after producing the first collimated input beam.

9. The method of claim 7, wherein the first and second collimated input beams travel along parallel, spatially non-overlapping input paths.

10. The method of claim 7, wherein the first and second diverging beams travel along spatially overlapping paths between the telescope system and the nonlinear lens.

11. The method of claim 7, wherein at least 80% of the first collimated output beam spatially overlaps with the second collimated output beam.

12. The method of claim 7, wherein the collimated output beams travel along parallel, spatially overlapping output paths.

13. An optical system comprising:
multiple laser sources operable to produce collimated input beams;
a telescope system arranged to receive the collimated input beams, wherein the telescope system is configured to modify each of the collimated input beams to produce diverging beams;
a nonlinear lens having an intensity-dependent refractive index and arranged to receive the diverging beams and refract each of the diverging beams to produce spatially overlapping collimated output beams, wherein at least 80% of any one of the collimated output beams spatially overlaps with another one of the collimated output beams; and
a controller configured to operate the laser sources to produce each of the collimated input beams in sequence, such that the collimated output beams are temporally non-overlapping.

14. The optical system of claim 13, wherein the collimated input beams travel along parallel, spatially non-overlapping input paths.

15. The optical system of claim 13, wherein the diverging beams travel along spatially overlapping paths between the telescope system and the nonlinear lens.

16. The optical system of claim 13, wherein the collimated output beams travel along parallel, spatially overlapping output paths.

* * * * *